(12) United States Patent
Almasi et al.

(10) Patent No.: US 10,108,539 B2
(45) Date of Patent: Oct. 23, 2018

(54) ALLOCATION OF DISTRIBUTED DATA STRUCTURES

(71) Applicant: International Business Machines Corporation, Armonk, NY (US)

(72) Inventors: Gheorghe Almasi, Ardsley, NY (US); Barnaby Dalton, Mississauga (CA); Ilie G. Tanase, Somers, NY (US); Ettore Tiotto, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1088 days.

(21) Appl. No.: 13/917,240

(22) Filed: Jun. 13, 2013

(65) Prior Publication Data

US 2014/0372724 A1    Dec. 18, 2014

(51) Int. Cl.
*G06F 12/0806* (2016.01)
*G06F 12/02* (2006.01)

(52) U.S. Cl.
CPC .... *G06F 12/023* (2013.01); *G06F 2212/1024* (2013.01); *G06F 2212/1056* (2013.01); *G06F 2212/656* (2013.01); *G06F 2212/657* (2013.01)

(58) Field of Classification Search
CPC ............ G06F 12/0223; G06F 12/1072; G06F 15/17331
See application file for complete search history.

(56) References Cited

U.S. PATENT DOCUMENTS

| | | | |
|---|---|---|---|
| 7,380,086 B2 | 5/2008 | Archambault et al. | |
| 7,409,525 B1 * | 8/2008 | Clark | G06F 12/1072 |
| | | | 711/206 |
| 7,680,987 B1 * | 3/2010 | Clark | G06F 12/08 |
| | | | 711/147 |
| 2008/0301256 A1 * | 12/2008 | McWilliams | G06F 12/0284 |
| | | | 709/214 |
| 2009/0199200 A1 * | 8/2009 | Arimilli | G06F 12/0284 |
| | | | 718/105 |
| 2010/0299495 A1 * | 11/2010 | Frank | 711/170 |

(Continued)

OTHER PUBLICATIONS

Partitioned Global Address Space 2005 Conference Description Page (http://web.archive.org/web/20111112154040/http://www.pgas.org/index.php?option=com_content&view=article&id=56:pgas-2005&catid=35:events&Itemid=64).*

(Continued)

*Primary Examiner* — Ann J Lo
*Assistant Examiner* — Leandro R Villanueva
(74) *Attorney, Agent, or Firm* — Cuenot, Forsythe & Kim, LLC

(57) ABSTRACT

Allocating distributed data structures and managing allocation of a symmetric heap can include defining, using a processor, the symmetric heap. The symmetric heap includes a symmetric partition for each process of a partitioned global address space (PGAS) system. Each symmetric partition of the symmetric heap begins at a same starting virtual memory address and has a same global symmetric break. One process of a plurality of processes of the PGAS system is configured as an allocator process that controls allocation of blocks of memory for each symmetric partition of the symmetric heap. Using the processor executing the allocator process, isomorphic fragmentation among the symmetric partitions of the symmetric heap is maintained.

14 Claims, 5 Drawing Sheets

(56) References Cited

U.S. PATENT DOCUMENTS

| | | | |
|---|---|---|---|
| 2011/0125974 A1 | 5/2011 | Anderson | |
| 2011/0289263 A1 | 11/2011 | McWillialms et al. | |
| 2013/0024645 A1* | 1/2013 | Cheriton | G06F 12/02 711/206 |
| 2013/0173740 A1* | 7/2013 | Jea et al. | 709/216 |
| 2013/0177017 A1* | 7/2013 | Elliott et al. | 370/390 |
| 2014/0095810 A1* | 4/2014 | Loewenstein et al. | 711/148 |
| 2014/0372725 A1* | 12/2014 | Almasi et al. | 711/173 |

OTHER PUBLICATIONS

Breitbart, J. "Dataflow-like synchronization in a PGAS programming model." In 2012 IEEE 26th Int'l. Parallel and Distributed Processing Sym. Workshops & PhD Forum (IPDPSW), pp. 762-769, IEEE, 2012 [retrieved Apr. 18, 2013] retrieved from the Internet: <http://eisreich.jensbreitbart.de/pub/Bre12a.pdf>, 8 pgs.

Serres, O. et al., "Address translation optimization for Unified Parallel C multi-dimensional arrays," In 2011 IEEE Int'l. Sym. on Parallel and Distributed Processing Workshops and Phd Forum (IPDPSW), pp. 1191-1198, IEEE, 2011 [retrieved Apr. 18, 2013] retrieved from the Internet: <https://upc-bugs.lbl.gov/~phargrov/sc11/pgas-booth-dvd/content/gwu/publications/ipdpsw11.pdf>, 8 pgs.

Bell, C. et al. "Firehose: An Algorithm for Distributed Page Registration on Clusters of SMPs." [online] In Proc. of 17th Int'l. Sym. on Parallel and Distributed Processing IPDPS '03, p. 198.1, IEEE Computer Society © 2003 [retrieved Apr. 18, 2013] retrieved from the Internet: <http://gasnet.cs.berkeley.edu/bell-nishtala--firehose-smp.pdf>, 15 Pgs.

Masmano, M. et al. "TLSF: A new dynamic memory allocator for real-time systems." In Proc. of 16th Euromicro Conf. on Real-Time Systems, 2004, ECRTS 2004, pp. 79-88. IEEE, 2004 [retrieved Apr. 18, 2013] retrieved from the Internet: <http://wks.gii.upv.es/tlsf/files/ecrts04_tlsf_0.pdf>, 10 pgs.

Farreras, M. et al., "Scalable RDMA performance in PGAS languages." In IEEE Int'l. Sym. on Parallel & Distributed Processing, IPDPS 2009, pp. 1-12. IEEE, 2009 [retrieved Apr. 18, 2013] retrieved from the Internet: <http://capinfo.e.ac.upc.edu/PDFs/dir00/file003364.pdf>, 12 pgs.

* cited by examiner

ALLOCATION OF DISTRIBUTED DATA STRUCTURES

STATEMENT REGARDING FEDERALLY SPONSORED RESEARCH OR DEVELOPMENT

This invention was made with government support under contract number HR0011-07-9-0002 awarded by the Defense Advanced Research Projects Agency (DARPA). The government has certain rights in the invention.

BACKGROUND

Some modern computer programs are capable of executing as one or more processes distributed across one or more communicatively linked nodes. A "node" refers to a physical data processing system such as a computer. The nodes are communicatively linked by a network. Each process has an independent virtual memory address space called a partition. The collection of all partitions for the computer program is called the "Partitioned Global Address Space" (PGAS). The computer program can be referred to as a PGAS program. Each partition typically stores different data.

From time to time, one process may require information from another process. The process in need of information, called the requesting process, issues a read request using a network transfer application programming interface (API) to copy or read bytes from the partition of another process called the target process. The requested bytes are sent to the requesting process in a response message and, once received, are copied into the partition of the requesting process. A similar series of events occurs to write bytes from the partition of one process to the partition of another process.

Network read and write operations are also called get and put operations. Network read and write operations are several orders of magnitude slower than locally performed read and write operations. A locally performed read or write operation is one performed by a process using the partition belonging to that process, e.g., using local memory. For this reason, PGAS programs with performance requirements are designed to minimize network operations in favor of local memory operations.

Often, a PGAS program distributes data structures across all partitions so that each process is able to work on local data. When necessary, data is exchanged between processes using network READ and WRITE operations. One issue with this approach is the necessity of keeping track of the location of data within each partition. One solution for keeping track of data is to maintain, for each distributed data structure, a list of virtual base addresses pointing to the memory block used in that partition. One such list is maintained for each partition. As an example, consider a system with 128 processes per node with approximately $2^{20}$ total processes. On a 64-bit machine, this would take at least: $8 \times 128 \times 2^{20} = 2^{30}$ bytes or 1 Gb per node per distributed data structure. This is both expensive in terms of storage as well as time to initialize the list of virtual memory addresses.

One approach for reducing the amount of memory needed for tracking the location of data structures has been to utilize a single handle per data structure. The handle is identical on all partitions with access to the data structure. Within each partition, a table or shared variable directory (SVD), maps the handle to the allocation for that handle on the same partition. Accordingly, the same 128 processes per node over $2^{20}$ processes on a 64-bit can be stored with only $8 \times 128$ bytes or 1 kilobyte per node per distributed data structure.

To utilize such an approach, address lookups for network read and/or write operations must be translated from the handle to a virtual base address. The translation is performed by the target process. Performing the translation, however, interrupts the target process from performing its assigned task(s) thereby reducing performance. In some systems, network hardware is able to accelerate read and write operations when the virtual memory address in the target partition is known by the requesting process. This acceleration is referred to as remote direct memory access (RDMA). In general, RDMA refers to the ability of one data processing system to directly access memory of another data processing system without involving the operating system of either data processing system. One of the benefits of RDMA is that the target process is not interrupted to perform address translation. RDMA requests, however, cannot be made in a PGAS implementation that uses SVD in the general case because the remote virtual memory address for the distributed data structure in the target process being accessed is not known by the requesting process. The target process is asked to perform the translation, thereby rendering RDMA unavailable.

BRIEF SUMMARY

One or more embodiments disclosed within this specification relate to managing a symmetric heap and allocating distributed data structures.

A method includes defining, using a processor, the symmetric heap to include a symmetric partition for each process of a partitioned global address space (PGAS) system. Each symmetric partition of the symmetric heap begins at a same starting virtual memory address and has a same global symmetric break. The method further includes configuring one process of a plurality of processes of the PGAS system as an allocator process that controls allocation of blocks of memory for each symmetric partition of the symmetric heap and, using the processor executing the allocator process, maintaining isomorphic fragmentation among the symmetric partitions of the symmetric heap.

A system includes a processor programmed to initiate executable operations. The executable operations include defining, using a processor, the symmetric heap to include a symmetric partition for each process of a PGAS system. Each symmetric partition of the symmetric heap begins at a same starting virtual memory address and has a same global symmetric break. The executable operations further include configuring one process of a plurality of processes of the PGAS system as an allocator process that controls allocation of blocks of memory for each symmetric partition of the symmetric heap and, using the processor executing the allocator process, maintaining isomorphic fragmentation among the symmetric partitions of the symmetric heap.

A computer program product includes a computer readable storage medium having program code stored thereon. The program code is executable by a processor to perform a method. The method includes defining, using the processor, the symmetric heap to include a symmetric partition for each process of a PGAS system. Each symmetric partition of the symmetric heap begins at a same starting virtual memory address and has a same global symmetric break. The method further includes configuring one process of a plurality of processes of the PGAS system as an allocator process that controls allocation of blocks of memory for each symmetric partition of the symmetric heap and, using the processor executing the allocator process, maintaining isomorphic fragmentation among the symmetric partitions of the symmetric heap.

DETAILED DESCRIPTION

Figure 1:
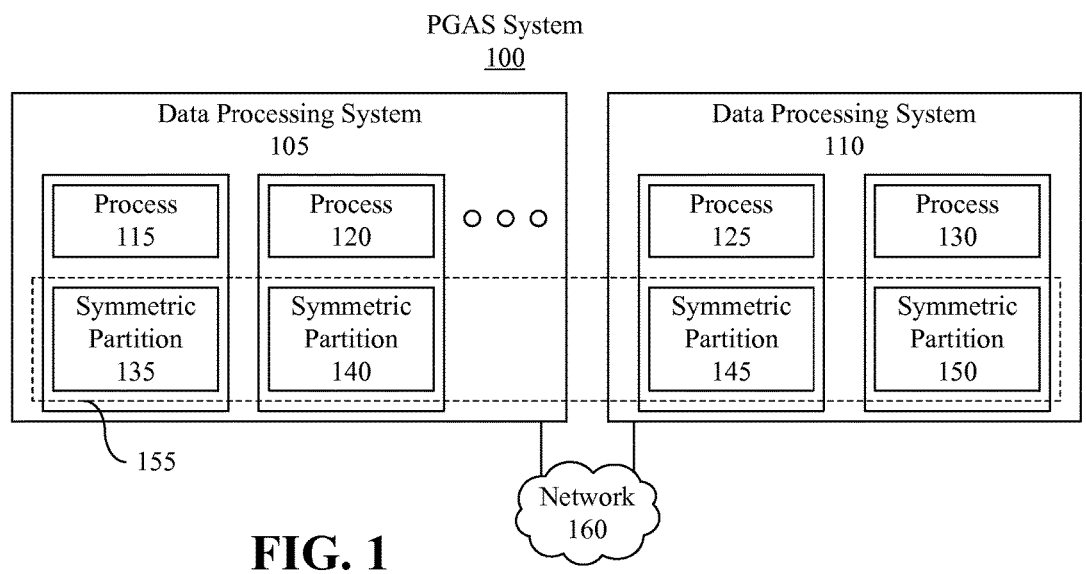
FIG. 1 is a block diagram illustrating an exemplary Partitioned Global Address Space (PGAS) system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. As defined herein, the term "computer-readable storage medium" means a tangible storage medium that contains or stores program code for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

This specification relates to implementation of a computer program configured to execute as one or more processes distributed across one or more communicatively linked nodes. In one aspect, the computer program is one that uses a Partitioned Global Address Space (PGAS) and, as such, is referred to as a PGAS program. A "node" refers to a physical data processing system such as a computer. The nodes are communicatively linked by a network. Thus, each node executes the PGAS program in one or more processes. Each process within a node includes different data items. In accordance with the inventive arrangements disclosed herein, the PGAS program can utilize a symmetric heap.

A symmetric heap is formed of a plurality of symmetric partitions. Each symmetric partition is an independent virtual memory address space. The collection of symmetric partitions is referred to as the PGAS. As each process executes, isomorphism is enforced among the symmetric partitions. The virtual memory address of a data structure in one symmetric partition will be the same as the virtual memory address of the data structure in each other symmetric partition. By enforcing isomorphism among the symmetric partitions, the benefits of remote direct memory access (RDMA) are more efficiently exploited for purposes of data sharing among processes since the need for address transactions is reduced or eliminated.

FIG. 1 is a block diagram illustrating an exemplary PGAS system 100. PGAS system 100 includes a plurality of nodes. Each node is illustrated as a data processing system. As such, PGAS system 100 includes data processing systems 105 and 110. PGAS system 100 can include fewer or more data processing systems. As such, the particular number of data processing systems pictured is for purposes of illustration only and is not intended as a limitation.

Each data processing system executes one or more processes of a PGAS program. Data processing system 105 includes or executes processes 115 and 120. Data processing system 110 includes or executes processes 125 and 130. Each data processing system can include fewer or more processes. As such, the particular number of processes pictured within each of data processing systems 105 and 110 is for purposes of illustration only and is not intended as a limitation.

Each process has, or is associated with, a symmetric partition. Within each of data processing systems 105 and 110, there is a one-to-one correspondence between processes and symmetric partitions. Process 115 has a symmetric partition 135. Process 120 has a symmetric partition 140. Process 125 has a symmetric partition 145. Process 130 has a symmetric partition 150. Symmetric partitions 135, 140, 145, and 150, taken collectively, form PGAS 155.

Each of data processing systems 105 and 110 is communicatively linked through network 160. Network 160 can be implemented as, or include, any of a variety of different networks such as a WAN, a LAN, a wireless network, a mobile network, a Virtual Private Network (VPN), the Internet, the Public Switched Telephone Network (PSTN), or the like.

As discussed, each of data processing systems 105 and 110 executes a PGAS program (not shown) as the various processes illustrated. While each of symmetric partitions 135, 140, 145, and 150 is isomorphic, the actual data stored within each symmetric partition can be different. Being isomorphic, each of symmetric partitions 135, 140, 145, and 150 has an identical structure. In one aspect, isomorphism means that each of symmetric partitions 135, 140, 145, and 150 is configured to start at a same virtual memory address. In addition, isomorphism means that a data structure that exists within each of symmetric partitions 135, 140, 145, and 150 will be located at the same virtual memory address in each of symmetric partitions 135, 140, 145, and 150. For example, consider the case in which an array of 1 million entries is spread across each of symmetric partitions 135, 140, 145, and 150 so that each partition has 250,000 entries. The array in each of symmetric partitions 135, 140, 145, and 150 will have different data items forming the 250,000 entries, but will be located at the same virtual memory address in each of symmetric partitions 135, 140, 145, and 150.

Figure 2:
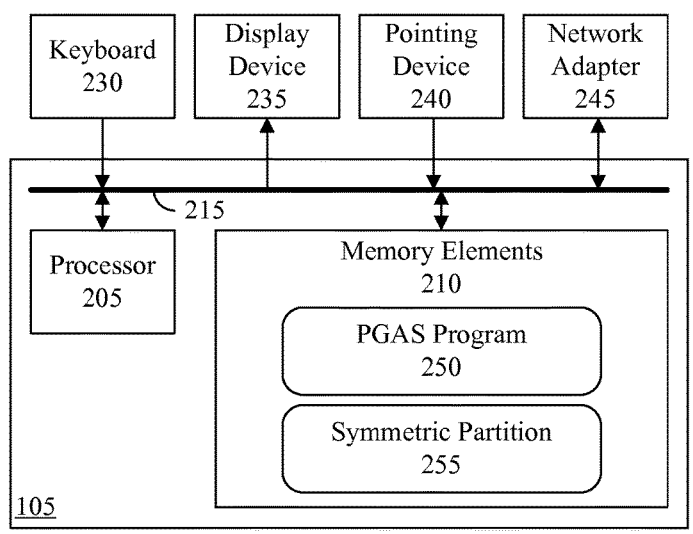
FIG. 2 is a block diagram illustrating an example of a data processing system used in implementing the PGAS system of FIG. 1.

FIG. 2 is a block diagram illustrating an example of data processing system 105 of PGAS system 100 of FIG. 1. The architecture illustrated and described in FIG. 2 can be used to implement each of the various data processing systems of PGAS system 100 of FIG. 1.

System 105 can include at least one processor 205, e.g., a central processing unit, coupled to memory elements 210 through a system bus 215 or other suitable circuitry. As such, system 105 can store program code within memory elements 210. Processor 205 executes the program code accessed from memory elements 210 via system bus 215 or the other suitable circuitry.

In one aspect, system 105 is implemented as a computer or other programmable data processing apparatus that is suitable for storing and/or executing program code. It should be appreciated, however, that system 105 can be implemented in the form of any system including a processor and memory that is capable of performing and/or initiating the functions and/or operations described within this specification. Further, system 105 can be implemented in any of a variety of different form factors.

Memory elements 210 include one or more physical memory devices such as, for example, a local memory (not shown) and one or more bulk storage devices (not shown). Local memory refers to RAM or other non-persistent memory device(s) generally used during actual execution of the program code. Bulk storage device(s) can be implemented as a hard disk drive (HDD), solid state drive (SSD), or other persistent data storage device. System 105 also can include one or more cache memories (not shown) that provide temporary storage of at least some program code in order to reduce the number of times program code must be retrieved from the bulk storage device during execution.

Input/output (I/O) devices such as a keyboard 230, a display 235, and a pointing device 240 optionally can be coupled to system 105. The I/O devices can be coupled to system 105 either directly or through intervening I/O controllers. One or more network adapters 245 also can be coupled to system 105 to enable system 105 to become coupled to other systems, computer systems, remote printers, and/or remote storage devices through intervening private or public networks. Modems, cable modems, wireless transceivers, and Ethernet cards are examples of different types of network adapters 245 that can be used with system 105.

As pictured in FIG. 2, memory elements 210 can store PGAS program 250 and a symmetric partition 255. PGAS program 250, being implemented in the form of executable program code, is executed by system 105 and, as such, is considered an integrated part of system 105. Symmetric partition 255, which stores data needed for execution of PGAS program 250, also is an integrated part of system 105. In this regard, PGAS program 250, symmetric partition 255, and any parameters and/or attributes utilized by PGAS program 250 and/or symmetric partition 255 are functional data structures that impart functionality when employed as part of system 105 and/or PGAS system 100. As discussed, each process of PGAS program 250 has a symmetric partition for its use as local data storage. The representation of data processing system 105 including symmetric partition 255 is for purposes of illustration only.

Figure 3:
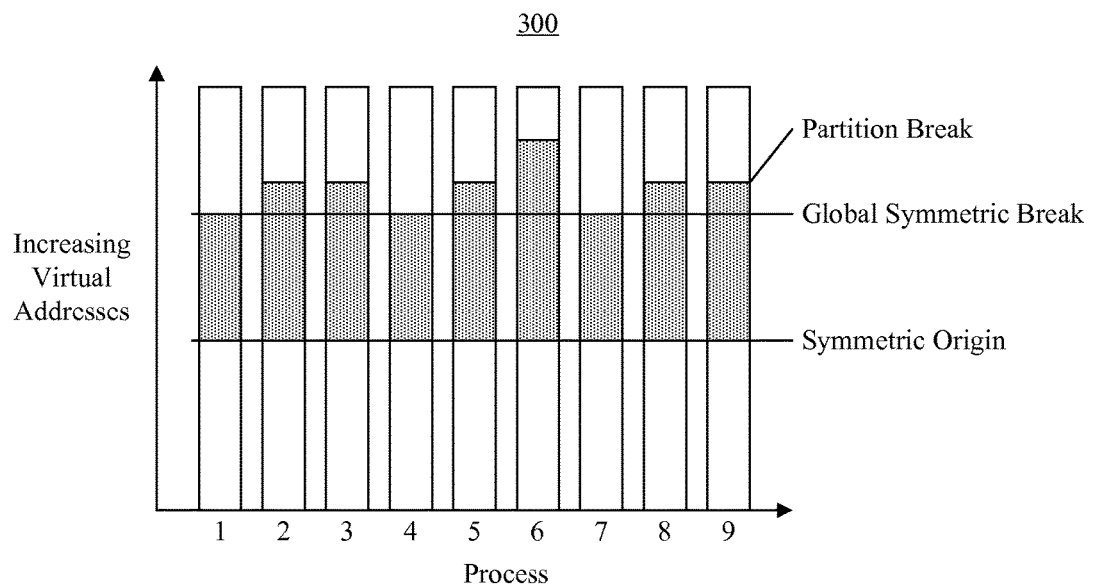
FIG. 3 is a pictorial view illustrating an example of a symmetric heap for a PGAS system.

FIG. 3 is a pictorial view 300 illustrating an example of a symmetric heap for a PGAS system as described with reference to FIG. 1. The symmetric heap illustrated in FIG. 3 is a distributed address space for a PGAS program. Referring to graph 300, the horizontal axis represents different processes of the PGAS system. The vertical axis represents virtual memory addresses. The virtual memory address increases in the direction of the arrow. As noted, one-to-one correspondence exists between processes 1-9 pictured in FIG. 3 and symmetric partitions. In one aspect, each of processes 1-9 is located within a same node of the PGAS system. In another aspect, one or more or each of processes 1-9 can be located in different nodes of the PGAS system.

In this example, there are nine processes. The particular number of processes used in the example of FIG. 3 is for purposes of illustration only and is not intended as a limitation. Fewer or more processes can be included depending upon the PGAS system implementation. For ease of illustration, each of processes 1-9 can be said to have a symmetric partition also numbered 1-9. The local symmetric partition of process 1, for example, is symmetric partition 1. Each of symmetric partitions 1-9 is reserved for storing distributed data structures used by the PGAS program. Further, each of symmetric partitions 1-9 is contiguous in virtual memory.

Modern 64-bit data processing systems have a virtual memory address space that is several orders of magnitude larger than the available physical memory. The vertical block above each of processes 1-9 represents the virtual memory of the process. The shaded portion of each block represents the portion of virtual memory that has been allocated and used to implement a symmetric partition for that process.

In a virtual memory system, physical memory may be mapped to any virtual memory address not already reserved for some other purpose. Two independent processes on the same data processing system may have distinct physical memory with the same virtual memory address in their respective virtual memory address spaces. Accordingly, most of the virtual memory address space in a 64-bit data processing system goes unused. In view of the availability of virtual memory, a region of virtual memory can be reserved in each node of the PGAS system and used to implement a symmetric partition. Thus, virtual memory addresses can be reserved systemically across processes.

As noted, symmetric partitions 1-9 are isomorphic. As such, each of symmetric partitions 1-9 begins at the same virtual memory address that is referred to as the "symmetric origin." In one aspect, the symmetric origin is aligned on a system memory-page boundary as a common operating system requirement. Each of symmetric partitions 1-9 has memory pages mapped into memory at increasing addresses starting with the symmetric origin. Each of symmetric partitions 1-9 has no unmapped gaps between mapped pages.

The lowest unmapped address greater than the symmetric origin in each of symmetric partitions 1-9 is called the "partition break." In FIG. 3, the partition break for each of symmetric partitions 1-9 is the top of the shaded region. As such, the partition break for a given process may or may not coincide with the global symmetric break. As illustrated in FIG. 3, the virtual memory address of the global symmetric break is the same, or identical, across each of processes 1-9. While the partition break may not be equal to the global symmetric break for a process, no partition break is permitted to be smaller than the global symmetric break. Similarly, the global symmetric break is not permitted to be less than the symmetric origin.

For example, in processes 1, 4, and 7, the partition break is the same as the global symmetric break. Thus, for each of processes 1, 4, and 7, the virtual memory address of the partition break is equal to the virtual memory address of the global symmetric break. In processes 2, 3, 5, 6, 8, and 9, the symmetric break is not the same as the global symmetric break. Thus, for each of processes 2, 3, 5, 6, 8, and 9, the virtual memory address of the partition break is larger than the virtual memory address for the global symmetric break.

One reason for allowing a process to have a partition break that is different than the global symmetric break is that a process may allocate memory in different granularities. For example, some nodes have a feature referred to as "huge pages" in which memory can be allocated in 16 MB increments. Other nodes, however, may be able to allocate memory in smaller 64 kB increments. A node capable of allocating memory in the smaller 64 kB increments will have a partition break that remains equal to the global symmetric break. The nodes that allocate memory in larger increments may have a partition break that exceeds the global symmetric break from time to time.

When additional virtual memory is required that is not available within the symmetric partitions, each of the symmetric partitions is grown by increasing the global symmetric break. In one aspect, one process issues a grow request using a broadcast operation to each other process thereby obtaining more virtual memory. In another aspect, each process collectively issues a grow request in unison thereby obtaining more virtual memory. In cases where the partition break of the node is larger than the global symmetric break by an amount at least as large as the amount by which the symmetric partition must be grown, such processes do not grow the symmetric partition.

For example, consider the case of process 6. Process 6 allocates memory in larger increments. When processes 1, 4, and 7 are required to increase the global symmetric break, the partition break of each of processes 1, 4, and 7 also is increased as part of the growing operation. Process 6, however, may not be required to grow symmetric partition 6 since the partition break of symmetric partition 6 likely is either equal to or still exceeds the increased virtual memory address to which the global symmetric break is raised for each symmetric partition.

Consider another example, in which the symmetric origin is at virtual memory address 0x4000 0000 0000. The global symmetric break is currently at virtual memory address 0x4000 1000 0000. For ease of illustration, this example uses only three symmetric partitions. Symmetric partition 1 and symmetric partition 2 each has a partition break at virtual memory address 0x4000 1000 000, which matches the global symmetric break. Unlike symmetric partitions 1 and 2, symmetric partition 3 has a partition break at virtual memory address 0x4000 2000 0000.

During operation, the global symmetric break is raised to virtual memory address 0x4000 1800 0000. As such, a grow request is issued to each process. Process 1 maps memory into the virtual memory address range 0x4000 1000 0000 to 0x4000 1800 0000. Process 1 increases its partition break to virtual memory address 0x4000 1800 0000. Process 2 maps memory into the virtual memory address range 0x4000 1000 0000 to 0x4000 2000 0000. Process 2 increases its partition break to virtual memory address 0x4000 2000 0000. Process 3, however, already satisfies the global symmetric break and does nothing except for updating its stored global symmetric break.

In accordance with another aspect, allocation of virtual memory is a distinct process or operation than mapping memory. Referring again to FIG. 3, one process is selected as the authoritative process that controls allocation. For purposes of illustration, process 1 is the authoritative process that controls allocation. Process 1 also can be referred to as the "allocator process." As such, process 1 is the only one of processes 1-9 that maintains a record or accounting of information within its symmetric partition, i.e., partition 1. Each other one of processes 2-9 maintains an isomorphically fragmented symmetric partition. A span of bytes that is unused in one symmetric partition is unused in each other symmetric partition.

The allocator process can be configured to perform various allocation functions or operations. For example, the allocator process can be configured to implement any of a variety of different, well-known allocator algorithms and/or techniques. In one particular example, the allocator process is configured to implement the techniques described in "TLSF: a New Dynamic Memory Allocator for Real-Time Systems," M. Masmano et al., Real-Time Systems, ECRTS 2004, Proceedings of the 16$^{th}$ Euromicro (2004). It should be appreciated that the aforementioned reference is but one example and that any of a variety of allocation techniques can be used. As such, the embodiments disclosed within this specification are not intended to be limited by the example provided.

In controlling allocation, the allocation process observes several rules. For example, the symmetric partition of the allocating process is fragmented in one or more contiguous blocks of memory. No two blocks of memory overlap. The collection of all blocks of memory covers the entire address space of the symmetric partition. As such, each block of memory is either free or used. Further, each block of memory in the symmetric partition of the allocator process exists isomorphically in each other symmetric partition. Thus, a block of memory that is marked as used in one symmetric partition is used in each other symmetric partition. Similarly, a block of memory that is marked as free in one symmetric partition is free in each other symmetric partition. In one aspect, the collection of all unused blocks of memory is called, or maintained, in a "freelist" as part of the allocator process. When discussing allocation of virtual memory and managing blocks of memory for a symmetric partition, it is understood that a block of memory refers to a block of virtual memory.

For purposes of illustration, however, the following is a listing of functions and/or operations that are performed by the allocator process to manage and/or control blocks of memory.

Find-free-block: An operation that finds a block of memory in the freelist that is at least as large as a specified or requested size for a block of memory. No block of memory is returned if the freelist includes no block of memory that satisfies the request.

Split-block: An operation that splits an N-byte block of memory (where N is an integer value) into two adjacent blocks of memory covering the same address space. One block of memory is sized to accommodate a requested size. The other block of memory from the split-block operation is made up from the residue bytes.

Merge-blocks: An operation that merges two adjacent blocks of memory into a single larger block of memory.

Remove-block: An operation that removes a block of memory from the freelist and marks the removed block of memory as being used.

Return-block: An operation that marks a used block of memory as unused and inserts the now unused block of memory into the freelist.

Create-block: An operation that marks a block of memory immediately succeeding or following the symmetric partition as a free block of memory and adds the free block of memory to the freelist. This operation is performed after expanding the symmetric heap with a grow operation.

Figure 4:
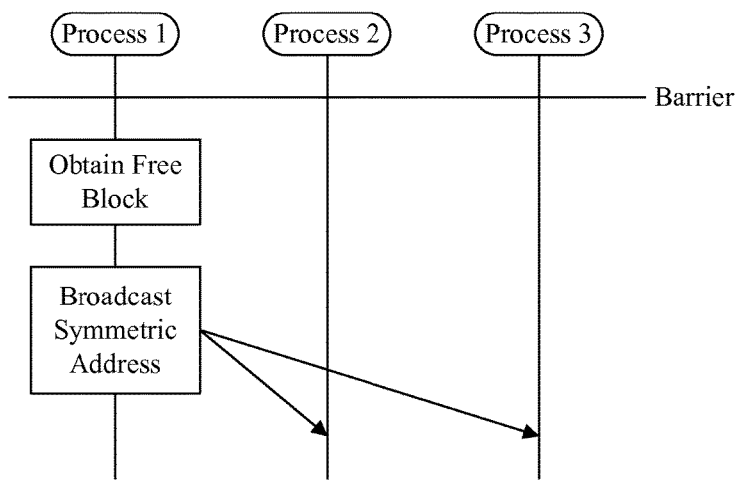
FIG. 4 is a diagram illustrating an exemplary implementation of a collective allocation operation for a symmetric heap.

FIG. 4 is a diagram illustrating an exemplary implementation of a collective allocation operation for a symmetric heap. A "collective allocation" refers to an allocation process that is executed concurrently by all processes. Each process has a pointer to the newly created data structure upon completion of the collective allocation operation. For purposes of illustration, process 1 is the allocator process and the PGAS system includes a total of three processes.

For example, referring to FIG. 4, each of processes 1-3 needs access to a distributed data structure with 10 kB per symmetric partition. Each process begins the allocation request concurrently for an unambiguous count of bytes per partition. Early processes wait at a "barrier" until all processes have reached the barrier. A "barrier" is a common primitive used in distributed programming. A barrier is a point in the distributed program where each process waits upon entering until all processes have entered the process. The barrier provides a guarantee that no process executes commands after the barrier until every process has executed all commands before the barrier. For example, any writes by any process before the barrier are completed before any reads by any process after the barrier.

Process 1 obtains a free block of memory. For example, process 1 can implement the "find-free block" operation that is at least as large as the size requested, which was 10 kB. In this example, process 1 successfully finds a 32 kB block of memory within symmetric partition 1 (the symmetric partition of process 1). Responsive to finding a block of memory that is free and of sufficient size, process 1 implements the "remove block" operation to mark the block as used and remove the block from the freelist. Since the size of the block of memory exceeds the requested size, process 1 can implement the "split-block" operation resulting in a 10 kB block of memory and a 22 kB block of memory. The residue block of memory, i.e., the 22 kB block of memory, from the split-block operation is returned to the freelist.

Responsive to obtaining the block of memory, process 1 broadcasts the virtual memory address of the block of memory. Process 1 broadcasts the virtual memory address of the 10 kB block of memory to each other process, e.g., process 2 and process 3. Accordingly, each of processes 1-3 now knows the location of the distributed data structure and may freely access the data structure. "Accessing" a data structure or memory means performing a read operation, a write operation, or both. Each process may access its local symmetric partition independently of each other process.

Because the location of the data structure is the same within each symmetric partition, each process can access data from the data structure in the symmetric partition of another, different process. Moreover, such access can occur using RDMA without interrupting the process from which data is to be read or written for the purpose of address translation or the like.

Figure 5:
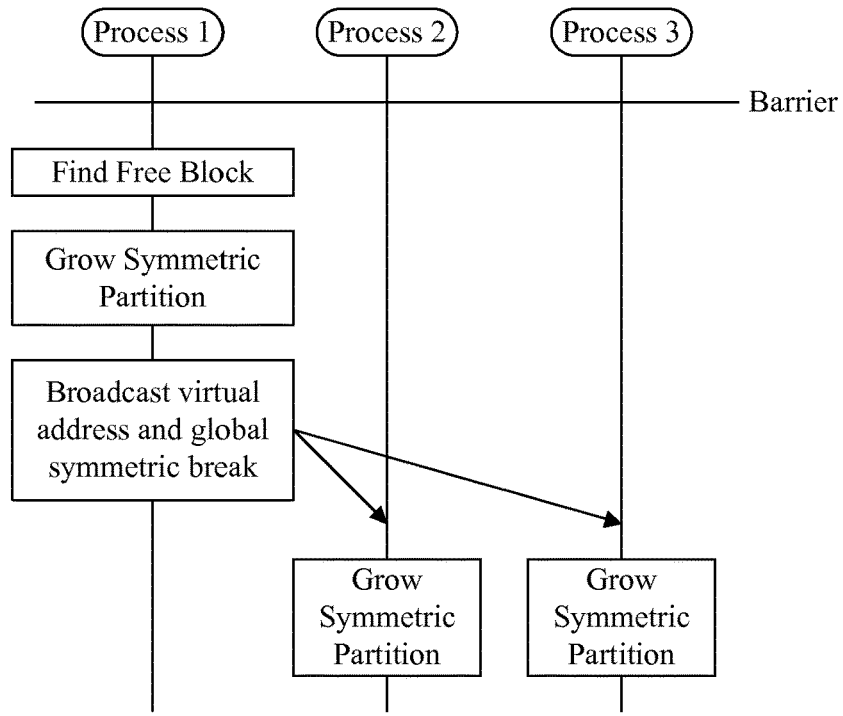
FIG. 5 is a diagram illustrating another exemplary implementation of a collective operation for a symmetric heap.

FIG. 5 is a diagram illustrating another exemplary implementation of a collective operation for a symmetric heap. Whereas FIG. 4 illustrates the case in which a block of memory was available, FIG. 5 illustrates the case in which a block of memory is not available and the symmetric heap must be grown. Again, the PGAS system includes a total of three processes and process 1 is the allocator process.

In the example of FIG. 5, each of processes 1-3 needs access to a distributed data structure with 64 kB per symmetric partition. Each process begins the allocation request concurrently for an unambiguous count of bytes per partition. Early processes wait at a "barrier" until all processes have reached the barrier.

Process 1 attempts to obtain a free block. For example, process 1 implements the "find-free block" operation. In general, responsive to determining that a sufficiently large block of memory cannot be found, process 1 increases the global symmetric break and issues a grow operation on the local symmetric partition (symmetric partition 1). The extended bytes are added to the free virtual memory of the symmetric partition guaranteeing the existence of a block of memory that is sized to accommodate the request.

In this example, process 1 is unable to find a free block of memory within symmetric partition 1 using the freelist that is at least 64 kB in size. According, process 1 implements a "grow symmetric partition" operation on its local symmetric partition, i.e., symmetric partition 1. Accordingly, process 1 increases the virtual memory address of the global symmetric break. More particularly, process 1 increases the virtual memory address of the global symmetric break by the size of the block of memory that is needed, e.g., 64 kB in this case. Process 1 inserts the newly mapped 64 kB of virtual memory into the freelist using the "create-block" operation. Process 1 immediately removes the 64 kB block of memory using the "remove-block" operation. The block of memory is appropriately sized and does not need to be split.

Process 1 then broadcasts the virtual memory address of the block of memory that was obtained by growing symmetric partition 1. Process 1 further broadcasts the updated global symmetric break to each of processes 2 and 3. Responsive to receiving an updated global symmetric break, each of processes 2 and 3 grow their own respective, or local, symmetric partitions to the virtual memory address of the broadcast global symmetric break. Process 2 grows symmetric partition 2. Process 3 grows symmetric partition 3.

Further, each of processes 1-3 can enter a second barrier to ensure that memory has been mapped on all symmetric partitions. Each of processes 1-3 now knows the location of the distributed data structure and the pages are mapped in memory.

Figure 6:
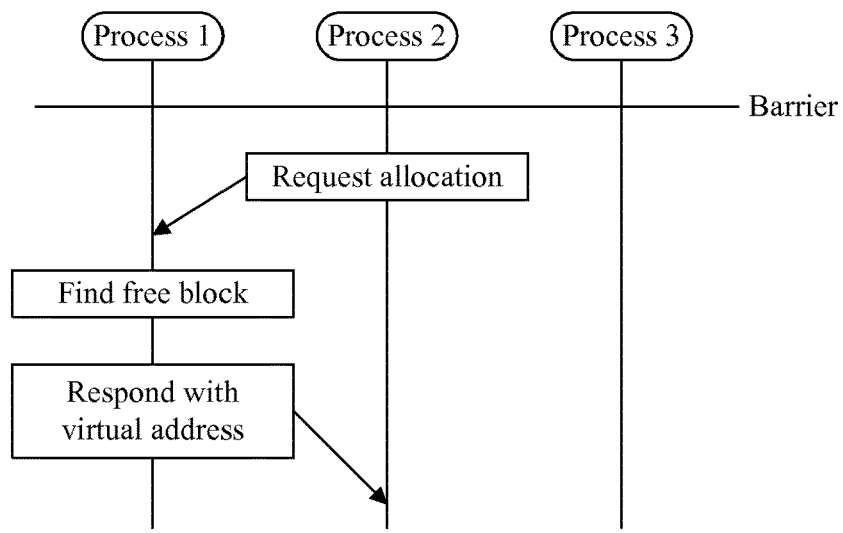
FIG. 6 is a diagram illustrating an exemplary implementation of an independent allocation for a symmetric heap.

FIG. 6 is a diagram illustrating an exemplary implementation of an independent allocation for a symmetric heap. An independent allocation is different from a collaborative allocation and, as such, is handled differently. An "independent allocation" refers to an allocation request from a single process without collaboration of other processes. Again, for purposes of illustration, it can be assumed that the PGAS system includes three processes and that process 1 is the allocator process.

In the example illustrated in FIG. 6, the requesting process is not the allocator process. As shown, process 2 requests an allocation from process 1. As part of controlling allocation of memory, process 1 is configured to serialized received independent allocation requests. Thus, to the extent that two or more independent allocation requests are received concurrently or simultaneously, process 1 serializes the received allocation requests. Two requests are never handled concurrently. In the case that requestor is the allocator process, the request is serialized with requests received from other processes. Process 1 handles each request for an independent allocation as outlined below.

Consider the case in which process 2 needs to create a distributed data structure with 1 MB per symmetric partition. Process 2 sends a request to process 1. Process 1 is interrupted to handle the request from process 2. Process 1 searches for a free block of memory that accommodates the request, e.g., is at least 1 MB in size. If a block of memory is found, process 1 removes the block of memory from the freelist. The block of memory is split if required.

Process 1, for example, implements a "find-free block" operation and successfully finds a free block of memory having a size of 1.2 MB. Process 1 implements the "remove-block" operation and implements the "split-block" operation. Accordingly, the residue block of memory sized at 0.2 MB is returned to the freelist. Process 1 responds to requestor, i.e., process 2, with the virtual memory address of the 1.0 MB block of memory. Process 1 returns to the operation or task that was being performed prior to being interrupted by the request from process 2. Process 2, waiting for the response from process 1, receives the response specifying the virtual memory address of the block of memory. Process 2 now knows the virtual memory address of the distributed data structure and performs any operations that may be required.

For an independent allocation, one process allocates, or requests allocation, of memory for all processes. The other processes, however, do not know the data structure is in their symmetric partition unless the requesting process notifies the other processes. Still, the other processes cannot allocate something in the same place because that block of memory is marked as used by the allocator process. This maintains isomorphism regardless of whether other processes know the particular data structure that exists in their symmetric partition.

Referring to the example in particular, the distributed data structure that is implemented within the block of memory within the symmetric partition for process 2 is distributed, or split, amongst all symmetric partitions. In this example, process 1 and process 2 know where the data structure is located. Because the allocator process, i.e., process 1, knows the fragmentation of the symmetric partitions, the isomorphism among all partitions is maintained. The allocator process, for example, does not allow the virtual address provided to process 2 to be used by any other process for a different data structure.

Figure 7:
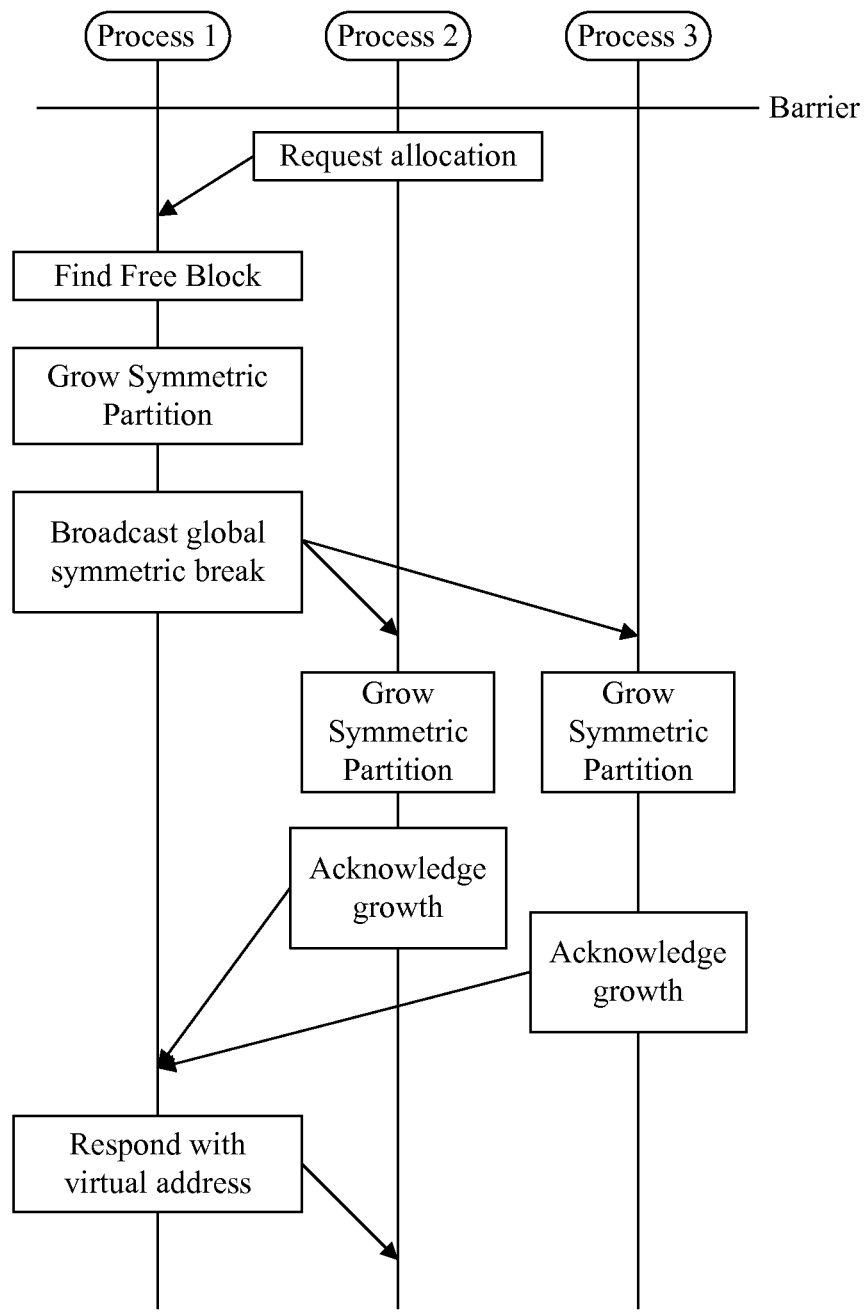
FIG. 7 is a diagram illustrating another exemplary implementation of an independent allocation for a symmetric heap.

FIG. 7 is a diagram illustrating another exemplary implementation of an independent allocation for a symmetric heap. Whereas FIG. 6 illustrates the case in which a block of memory is available, FIG. 7 illustrates the case where a block of memory is not available and the symmetric heap must be grown. Again, for purposes of illustration, it can be assumed that the PGAS system includes three processes and that process 1 is the allocator process.

In the example illustrated in FIG. 7, the requesting process is not the allocator process. As shown, process 2 requests an allocation from process 1. Referring to the prior example, process 2 needs to create a distributed data structure with 1 MB per symmetric partition. Process 2 sends a request to process 1. Process 1 is interrupted to handle the request from process 2. Process 1 implements the "find-free block" operation, which does not return a block of memory of at least 1 MB in size. A block of memory of at least 1 MB is not found on the freelist.

Since no block of memory is found within partition 1 that accommodates the request, process 1 increases the global symmetric break to guarantee sufficient free virtual memory. Process 1 increases the global symmetric break and issues a grow operation to the local symmetric partition, i.e., symmetric partition 1. Process 1 creates a block from the newly mapped memory. Process 1 then broadcasts the new virtual address of the global symmetric break to each other process. Broadcasting the global symmetric break is, in effect, a command from process 1 to each other process to grow their local symmetric partitions. Issuing this command maintains the global symmetric break invariant. Process 1, in issuing the grow command, interrupts each other process to issue grow commands for their own local symmetric partitions.

When process 1 receives an acknowledgement of the growth from each other process, the allocation is complete and the symmetric data structure is usable. Accordingly, responsive to the acknowledgement from each other process, process 1 provides a response to the requesting process, e.g., process 2, with the virtual memory address of the block of memory.

Referring to FIGS. 4-7, when the PGAS program begins execution, the global symmetric break is equal to the symmetric origin. Accordingly, the allocator thread begins growing the symmetric heap through grow operations as described when further blocks of memory are required. While the allocator process is interrupted for purposes of allocating virtual memory, the other processes are not interrupted for network read and/or writes.

Any single process may request a block of memory initially returned by a symmetric allocation call to be freed. Either a collective allocation or an independent allocation of a block of memory can be freed by any process. If the allocator process no longer needs a block of memory, the allocator process initiates an operation to free the block of memory. For example, the allocator process implements the "return-block" operation to return the block of memory to the freelist. If a free operation is initiated by another process, that process sends a request to the allocator process to free the block of memory. Accordingly, the allocator process implements the "return-block" operation for the particular block of memory specified by the request from the other process. The allocator process does not attempt to shrink the symmetric heap.

Figure 8:
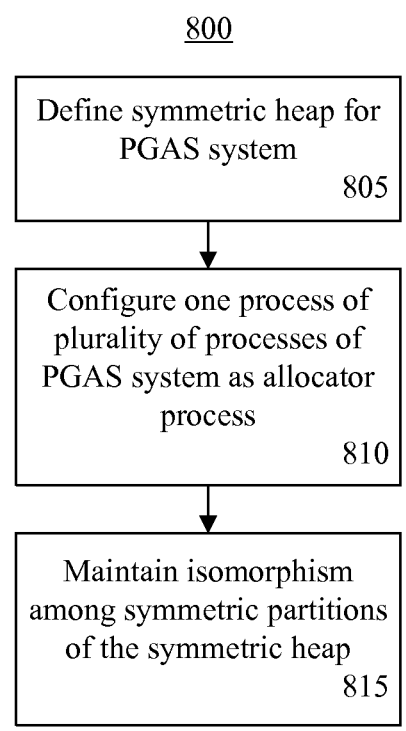
FIG. 8 is a flow chart illustrating an exemplary method of managing distributed data structures for a PGAS system.

FIG. 8 is a flow chart illustrating an exemplary method 800 of managing distributed data structures for a PGAS system. Method 800 can be performed by a PGAS system as described within this specification. In block 805, a processor of the PGAS system defines a symmetric heap including a symmetric partition for each process of the PGAS system. Each symmetric partition of the symmetric heap begins at a same starting virtual memory address and has a same global symmetric break. In block 810, the processor configures, or designates, one process of a plurality of processes of the PGAS system as an allocator process that controls allocation of blocks of memory for each symmetric partition of the symmetric heap. In block 815, the processor maintains, e.g., through execution of the allocator process, isomorphic fragmentation among the symmetric partitions of the symmetric heap. Isomorphism is maintained as described herein using the various operations described.

The various operations described within this specification can be implemented as runtime routines accessible to the user. The routines can be implemented within a language runtime of a PGAS-enabled programming language. In accordance with the inventive arrangements disclosed herein, by enforcing isomorphism among the symmetric partitions of the symmetric heap, the speed of RDMA can be more efficiently exploited. Further, the benefits of reduced storage requirements of a shared variable directory are maintained.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A computer hardware system, comprising:
   a hardware processor programmed to initiate the following executable operations:
   defining a symmetric heap comprising a symmetric partition for each process of a partitioned global address space (PGAS) system;
   wherein each symmetric partition of the symmetric heap begins at a same starting virtual memory address and has a same global symmetric break;
   configuring one process of a plurality of processes of the PGAS system as an allocator process that controls allocation of blocks of memory for each symmetric partition of the symmetric heap; and
   maintaining, by the allocator process, isomorphic fragmentation among the symmetric partitions of the symmetric heap.

2. The system of claim 1, wherein the symmetric partition of the allocator process is an allocator partition, wherein the hardware processor is further programmed to perform:
   responsive to obtaining a block of memory of a requested size from within the allocator partition, the allocator process broadcasting a virtual memory address of the block of memory to each other process.

3. The system of claim 1, wherein the symmetric partition of the allocator process is an allocator partition, wherein the hardware processor is further programmed to perform:
   responsive to determining that no block of memory of a requested size is available within the allocator partition, the allocator process adding virtual memory to the allocator partition by increasing the virtual memory address of the global symmetric break in the allocator partition and obtaining a block of memory from added virtual memory; and
   the allocator process broadcasting a virtual memory address of the block of memory and the global symmetric break to each other process.

4. The system of claim 1, wherein the wherein the hardware processor is further programmed to perform:
   responsive to receiving, within the allocator process, a request for a block of memory from a requesting process for a particular size, obtaining a block of memory of particular size within the allocator partition and sending a virtual memory address of the block of memory to the requesting process.

5. The system of claim 1, wherein the wherein the hardware processor is further programmed to perform:
   responsive to receiving a plurality of requests for blocks of memory within the allocator process, serializing the plurality of requests for blocks of memory.

6. The system of claim 1, wherein the wherein the hardware processor is further programmed to perform:
   receiving a request for a block of virtual memory for a particular size from a requesting process;
   responsive to determining that no block of memory of the particular size is available within the allocator partition, the allocator process adding virtual memory to the allocator partition by increasing the virtual memory address of the global symmetric break in the allocator partition and obtaining a block of memory from added virtual memory;
   broadcasting the global symmetric break to each other process; and
   responsive to receiving an acknowledgement from each other process that the local symmetric partition of each other process has grown, sending the requesting process a virtual memory address of the obtained block of memory.

7. The system of claim 1, wherein at least one of the symmetric partitions has a partition break that is beyond the global symmetric break.

8. A computer program product, comprising:
   a hardware storage device having program code stored thereon,
   the program code executable by a processor to perform a method comprising:
   defining, using the processor, a symmetric heap comprising a symmetric partition for each process of a partitioned global address space (PGAS) system;
   wherein each symmetric partition of the symmetric heap begins at a same starting virtual memory address and has a same global symmetric break;
   configuring, using the processor, one process of a plurality of processes of the PGAS system as an allocator process that controls allocation of blocks of memory for each symmetric partition of the symmetric heap; and
   maintaining, using the processor executing the allocator process, isomorphic fragmentation among the symmetric partitions of the symmetric heap.

9. The computer program product of claim 8, wherein the symmetric partition of the allocator process is an allocator partition, the method further comprising:
   responsive to obtaining a block of memory of a requested size from within the allocator partition, the allocator process broadcasting a virtual memory address of the block of memory to each other process.

10. The computer program product of claim 8, wherein the symmetric partition of the allocator process is an allocator partition, the method further comprising:
    responsive to determining that no block of memory of a requested size is available within the allocator partition, the allocator process adding virtual memory to the allocator partition by increasing the virtual memory address of the global symmetric break in the allocator partition and obtaining a block of memory from added virtual memory; and the allocator process broadcasting a virtual memory address of the block of memory and the global symmetric break to each other process.

11. The computer program product of claim 8, the method further comprising:

responsive to receiving, within the allocator process, a request for a block of memory from a requesting process for a particular size, obtaining a block of memory of particular size within the allocator partition and sending a virtual memory address of the block of memory to the requesting process.

12. The computer program product of claim 8, the method further comprising:

responsive to receiving a plurality of requests for blocks of memory within the allocator process, serializing the plurality of requests for blocks of memory.

13. The computer program product of claim 8, the method further comprising:

receiving a request for a block of virtual memory for a particular size from a requesting process;

responsive to determining that no block of memory of the particular size is available within the allocator partition, the allocator process adding virtual memory to the allocator partition by increasing the virtual memory address of the global symmetric break in the allocator partition and obtaining a block of memory from added virtual memory;

broadcasting the global symmetric break to each other process; and responsive to receiving an acknowledgement from each other process that the local symmetric partition of each other process has grown, sending the requesting process a virtual memory address of the obtained block of memory.

14. The computer program product of claim 8, wherein at least one of the symmetric partitions has a partition break that is beyond the global symmetric break.

* * * * *